(12) United States Patent
Byrns

(10) Patent No.: US 6,373,884 B1
(45) Date of Patent: Apr. 16, 2002

(54) METHOD AND APPARATUS FOR TRANSMITTING DATA

(75) Inventor: John Paul Byrns, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/814,395

(22) Filed: Mar. 11, 1997

(51) Int. Cl.⁷ .................................................. H04B 1/38
(52) U.S. Cl. ...................... 375/219; 375/220; 370/474; 370/465
(58) Field of Search ................................. 375/219, 220, 375/228, 230, 368, 363; 370/474, 465, 522, 410, 384, 377, 373, 349; 380/15, 20, 42, 44, 48

(56) References Cited

U.S. PATENT DOCUMENTS

| | | | | |
|---|---|---|---|---|
| 4,574,362 A | * | 3/1986 | Spindel et al. ............... | 370/472 |
| 4,949,333 A | * | 8/1990 | Gulick et al. ............... | 370/282 |
| 5,204,768 A | * | 4/1993 | Tsakiris et al. ......... | 340/825.72 |
| 5,206,851 A | * | 4/1993 | Cho ............................. | 369/48 |
| 5,420,809 A | * | 5/1995 | Read et al. ............. | 364/715.01 |
| 5,502,696 A | * | 3/1996 | Yoon et al. ................... | 369/32 |
| 5,521,921 A | * | 5/1996 | Murai ......................... | 370/474 |
| 5,550,829 A | * | 8/1996 | Wang ........................ | 370/95.1 |
| 5,553,067 A | * | 9/1996 | Walker et al. .............. | 370/474 |
| 5,621,720 A | * | 4/1997 | Bronte et al. ............... | 370/241 |
| 5,717,760 A | * | 2/1998 | Satterfield ..................... | 380/42 |
| 5,748,681 A | * | 5/1998 | Comino et al. ............. | 375/319 |
| 5,842,113 A | * | 11/1998 | Nanda et al. ................. | 455/69 |
| 6,038,436 A | * | 3/2000 | Priest ......................... | 455/343 |
| 6,070,140 A | * | 5/2000 | Tran ........................... | 404/275 |

OTHER PUBLICATIONS

Infrared Data Association, "Serial Infrared Link Access Protocol (IrLAP)", Version 1.1, Jun. 16, 1996.
American National Standards Institute, Inc., "American National Standard for Advanced Data Communication Control Procedures (ADCCP)", Jan. 9, 1979, pp. 19–22.

* cited by examiner

*Primary Examiner*—William Trost
*Assistant Examiner*—Congvan Tran
(74) *Attorney, Agent, or Firm*—John J. King; Daniel R. Collopy

(57) ABSTRACT

A method and apparatus for transmitting data improves efficiency and guarantees consistency in the data transmission rate. According to the method and apparatus, a data offset byte (402) is determined for a frame of data to be transmitted. The data offset value is used to modify the data bytes of the data frame to insure that the modified data bytes does not include control bytes (320) which are sent with the data. The offset value and the modified data bytes are then sent (508) to a receiver which recovers (710) the data. Accordingly, only one offset byte must be transmitted for each frame of data.

19 Claims, 4 Drawing Sheets

— PRIOR ART —

METHOD AND APPARATUS FOR TRANSMITTING DATA

FIELD OF THE INVENTION

The present invention is related to the transmission data, and more particularly to a method and apparatus for transmitting data between communication devices.

BACKGROUND OF THE INVENTION

Data communication schemes have been developed and used to transmit data between devices, such as electronic devices, according to the type of data being transmitted. In a synchronous communication system, transmission is accomplished by sending bit streams and character streams which are slaved to accurately synchronized clocks at the transmitting and receiving stations. Because a constant time interval is established between successive bits, characters, or events, beginning and end pulses are not required with each character. That is, synchronous transmission associated with a clock signal keeps the transmitter and receiver in phase. In contrast, in an asynchronous communication system, the transmission of data is independently controlled by beginning and end pulses in each frame of data. Although the data may be partitioned into frames of a predetermined number of bits and control bytes must be transmitted, the transmission of the bits or frames are not dependent upon a clock signal.

In order to transmit data in either mode, control signals or bytes are transmitted to provide the receiver with information to help decode the data. For example, control bytes representing the beginning of a frame (BOF) of data and an end of frame (EOF) of data are transmitted to provide an indication to the receiver that the data frame has been sent when sending asynchronous data. Particularly, the control bytes are particular bit arrangements which would be recognized by the receiver as having a particular meaning, such as that the data is being started or ended.

However, a problem occurs when the control signals are present in the data to be transmitted. That is, a receiver may decode the bits of data as being a control signal, and incorrectly receive the remaining data of the frame. In order to avoid sending data which could be interpreted as a control signal, the data could be assigned bit patterns such that the data could not include the bit patterns of the control signals. For example, when transmitting ASCII bit patterns representing alphanumeric characters, the ASCII bit patterns could be chosen to insure that they do not correspond to control signal bit patterns. However, such systems for transmitting asynchronous data are limited to the transmission of predefined bit patterns representing certain characters, such as letters.

According to another scheme for transmitting asynchronous data, the data is modified prior to transmitting to insure that the data does not include a control signal. For example, if the control signal represents six "one" bits in row, the transmitter will insert a "zero" bit whenever a five "one" bits are detected in the data. Accordingly, when the receiver detects five data bits, the receiver will remove the following "zero" and decode the next bit as either a "one" or "zero". If the following bit is a "one" bit, representing six "one" bits of data, the receiver will not detect the six "one" bits as a control byte, but as data. In contrast, when the receiver detects six "one" bits in a row (without removing a "zero" bit), the receiver will detect the control signal. Such a scheme for transmitting data is described in the advanced data communication control procedures (ADCCP), published by the American Nationals Standards Institute, Inc., on Jan. 9, 1979. However, such bit "stuffing" require the transmission of additional data, which lowers the speed and efficiency of the data transmission system.

Finally, according to another scheme for transmitting asynchronous data, a control byte, called an escape ("ESC") byte is transmitted prior to sending a byte of data which corresponds to a control byte. In addition to sending the control bit, the data byte itself could be altered, such by an "exclusive or" Boolean operation. Upon receiving an escape byte, the receiver would know that the following byte is not a control signal and should be decoded. However, such methods require the transmission of an escape byte for each byte which corresponds to a control byte, and also lowers the speed and efficiency of the data transmission system. Such a system also creates inconsistency in data efficiency. For example, if one frame coincidentially had a number of data bytes which coincided with control bits, the system would be particularly inefficient for that frame because it would have to send an escape byte for each such data byte Accordingly, there is a need for an improved method and apparatus for transmitting data.

DESCRIPTION OF THE PREFERRED EMBODIMENTS

A method and apparatus for transmitting data both improves efficiency and guarantees consistency in the data transmission rate. According to the present disclosure, a data offset value is determined for each frame of data. The data offset value is used to modify the data to insure that the data does not include control bytes which are sent with the data. For example, the offset value is calculated such that when the offset value is subtracted, such as by modulo 265 subtraction, from each byte of data in the frame, the bytes of data do not correspond to any control bytes which are sent. The offset value is then sent with the modified bytes of data to a receiver which decodes the data bytes by adding the offset value to each data byte and processes the data. Accordingly, only a single offset value must be transmitted with each frame of data to prevent each byte of data from being misinterpreted as a control byte.

Figure 1:
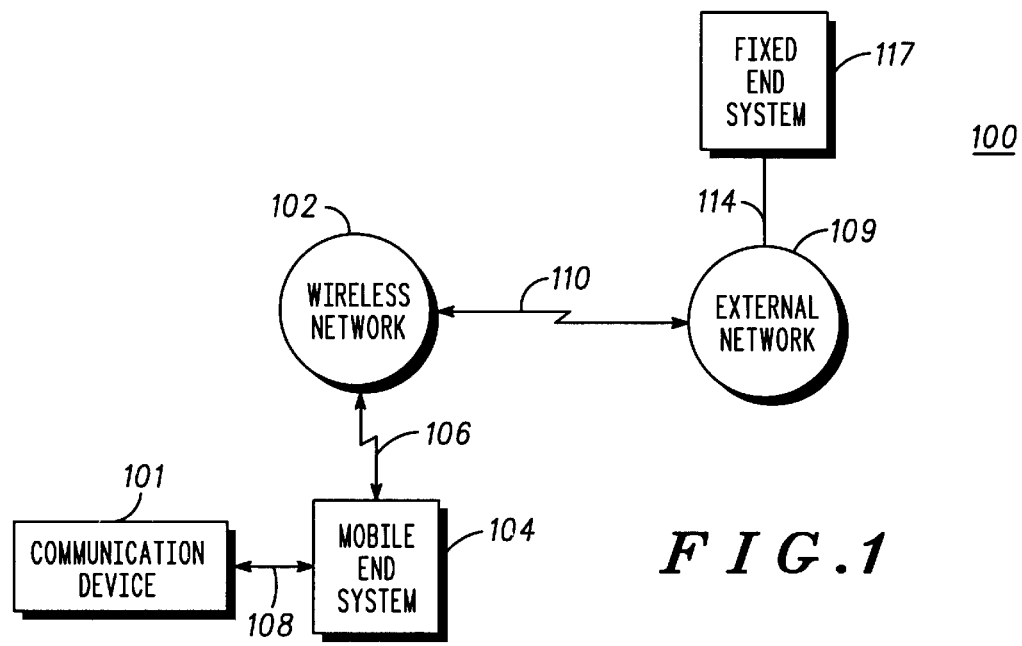
FIG. 1 is a diagram of a communication network according to the present invention.

Turning first to FIG. 1, a communication network 100 for incorporating a communication device 101 of the present invention is shown. In general, the communication network is adapted to transmit data and other signals between communication devices in wireless networks, such as a cellular telephones network, and conventional landline networks, such a public system telephone network (PSTN) coupled to a computer network. In particular, a wireless network 102 is shown coupled to receive radio frequency (RF) signals from a mobile end system 104, such as a mobile or portable cellular radiotelephone or other wireless communication device such as a handsfree 3 watt booster car-kit for receiving communication device 101, by way of a communication link 106, such as an RF link.

Communication device 101, such as a portable radiotelephone or other wireless communication device, could be coupled to mobile end system 104 by way of a communication link 108, which could be an optical link, such as an infrared link, a standard EIA-232 interface connection, a modem connection, or some other link. The wireless network 102 is also preferably coupled to an external network 109, such as a public system telephone network by way of a communication link 110. Communication link 110 could be a wireless link, or could be provided by a physical connection between the wireless network and the external network. The external networks are coupled to a fixed end system by way of existing infrastructure.

While the communication network of FIG. 1 enables the transmission of signals between a mobile end system and fixed end system by way of example, the present invention could also apply to communication between two mobile end systems coupled to the wireless network or even two discrete communication devices, independent of any network. The present invention also could be employed in any communication environment, such as paging, Personal Communication Services (PCS), satellite communication services, telecommunications or computers. Also, while the present method and apparatus find particular application in transmitting data between two communication devices, by wireless transmission, such as by infrared data transmission, the method for transmitting data of the present disclosure could be used in any of the communication links 106, 108, 110, and/or 114.

Figure 2:
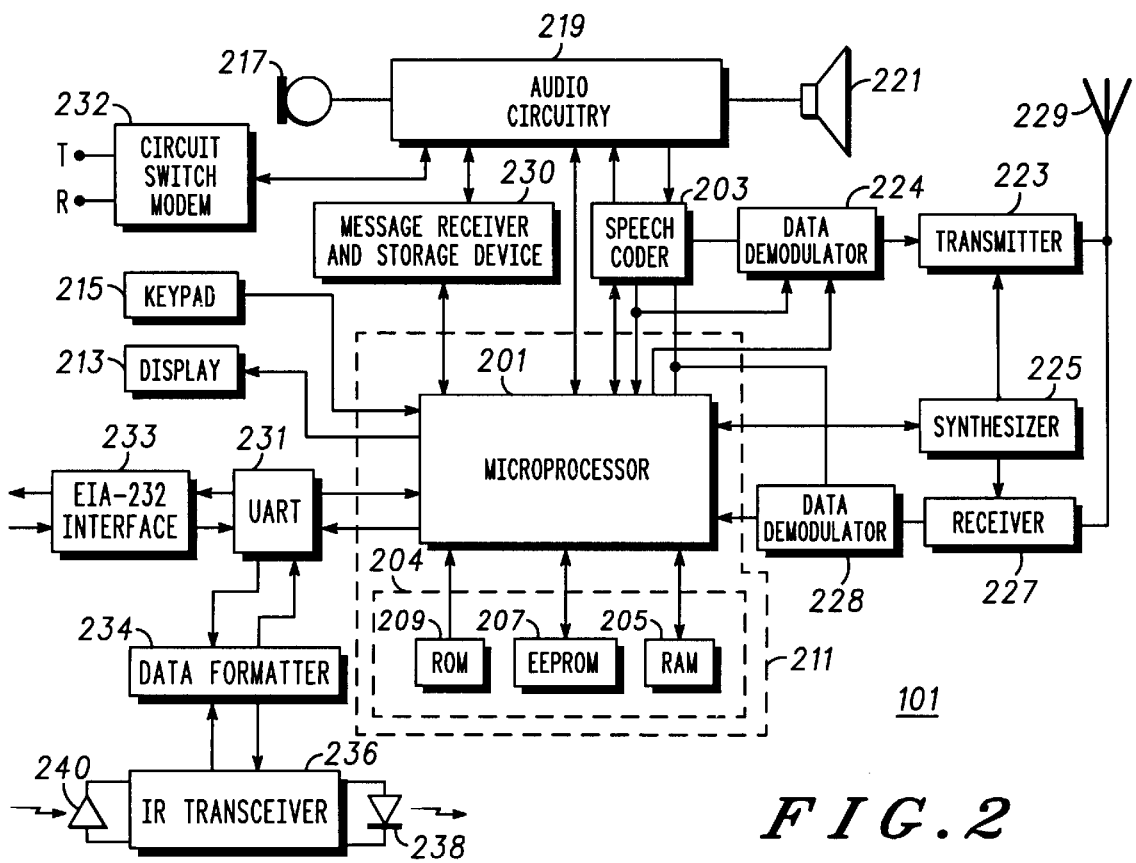
FIG. 2 is a block diagram of a communication device according to the present invention.

Turning now to FIG. 2, a block diagram of a communication device, such as a cellular radiotelephone, incorporating the present invention is shown. In the preferred embodiment, a microprocessor 201, such as a 68HC11 microprocessor available from Motorola, Inc., and a speech coder 203 combine to generate the necessary communication protocol for operating in a cellular system. Microprocessor 201 uses RAM 205, EEPROM 207, and ROM 209, preferably consolidated in one package 211, to execute the steps necessary to generate the protocol and to perform other functions for the communication unit, such as writing to a display 213, accepting information from a keypad 215, and controlling a frequency synthesizer 225. Speech coder 203 processes audio transformed by audio circuitry 219 from a microphone 217 and to a speaker 221. A transceiver processes the radio frequency signals. In particular, a transmitter 223 receives modulated data from data modulator 224 and transmits the data through an antenna 229 using carrier frequencies produced by a frequency synthesizer 225. Information received by the communication device's antenna 229 enters receiver 227 which provides demodulated signals to the processing circuit by way of data demodulator 228.

The communication device may optionally include a message receiver and storage device 230 including digital signal processing means. The message receiver and storage device could be, for example, a digital answering machine or a paging receiver. The communication device may include a circuit switch modem 232. Circuit switch modems are well known to those skilled in the art of telecommunications, and could be used to transmit data according to the present invention. Finally, the communication device includes a universal asynchronous receiver/transmitter (UART) 231. UARTs, which are well known in the art, are used interface a controller to a bit serial communication network. UART 231 is coupled to a EIA-232 interface 233 for transmitting serial data. Preferably, the communication device also includes a data formatter 234 for providing serial communication signals to an IR transceiver 236. Formatter 234 insures that IR transmitter 236 is properly signalled to transmit the data provided by UART 231 according to IR data protocols. The transmitter portion of infrared (IR) transceiver 236 comprises a transmitter diode 238, while the receiver portion comprises a detector diode 240. While specific data transmission devices are shown, other data transmission devices could be used according to the present invention. Also, other arrangements for transmitting IR signals according to the method of the present invention could be employed.

Figure 3:
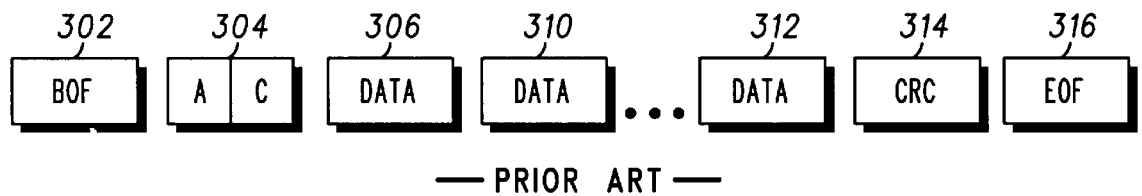
FIG. 3 is a frame diagram showing a conventional data frame.
Figure 4:
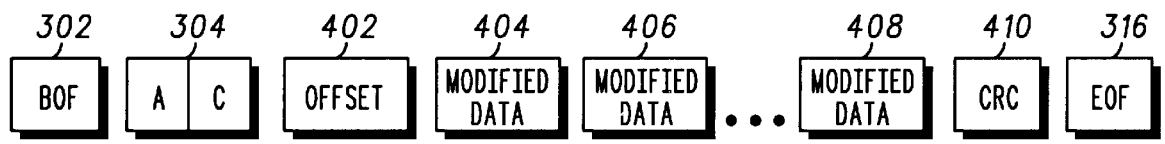
FIG. 4 is a frame diagram showing a data frame according to the present invention.

Turning now to FIG. 3, a conventional frame for transmitting data is shown. In particular, the frame includes a BOF byte 302, followed by an address/control byte 304. Data bytes 306, 310, and 312 follow. A cyclical redundancy check (CRC) byte 314 as is well known in the art, is then transmitted. Finally, an EOF byte 316 is transmitted. As is shown in FIG. 4, an offset byte 402 is added to the frame. As will be described in more detail in reference to FIG. 6, the offset byte is calculated to insure that the modified data bytes 404, 406, and 408 will not be identical to BOF byte 302, EOF byte 316, or other byte which may be transmitted, such as an ESC byte previously described. Modified data bytes 404–408 which are original bytes 306, 310–312 modified by the offset, and CRC 410, based upon the address/control byte, the offset byte and the modified data bytes, are also sent in the frame.

Figure 5:
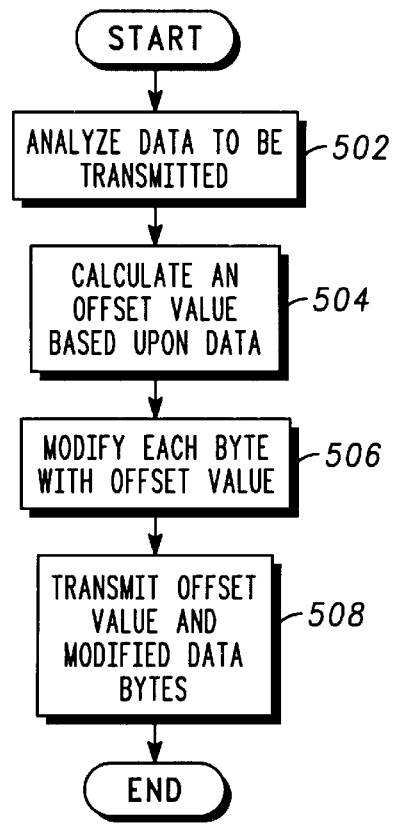
FIG. 5 is a flow chart showing a method for transmitting data according to the present invention.

Turning now to FIG. 5, a flow chart shows the preferred steps for transmitting data according to the present invention. Communication device 101, preferably through microprocessor 201, analyzes the data to be transmitted at a step 502. For example, when transmitting a frame having data partitioned into bytes, the bytes are compared to control bytes to determine whether any of the data bytes corresponds to control bytes. The communication device will then calculate an offset value based upon the data at a step 504 The offset value will be calculated such that when the data is modified by the offset value at a step 506, the modified data bytes will not correspond to any control bytes which are sent. For example, the offset could be subtracted from the data byte by modulo 256 subtraction to generate a modified data byte. The resulting modified data byte would then no longer correspond to the control signals. Alternatively, the data bytes could be modified by modulo 2 addition (i.e. providing the product of an "exclusive or" with a predetermined value, or some other function. The offset value and modified data is then sent to a receiver at a step 508. The receiver can use the offset value to reconstruct the original data bytes.

Figure 6:
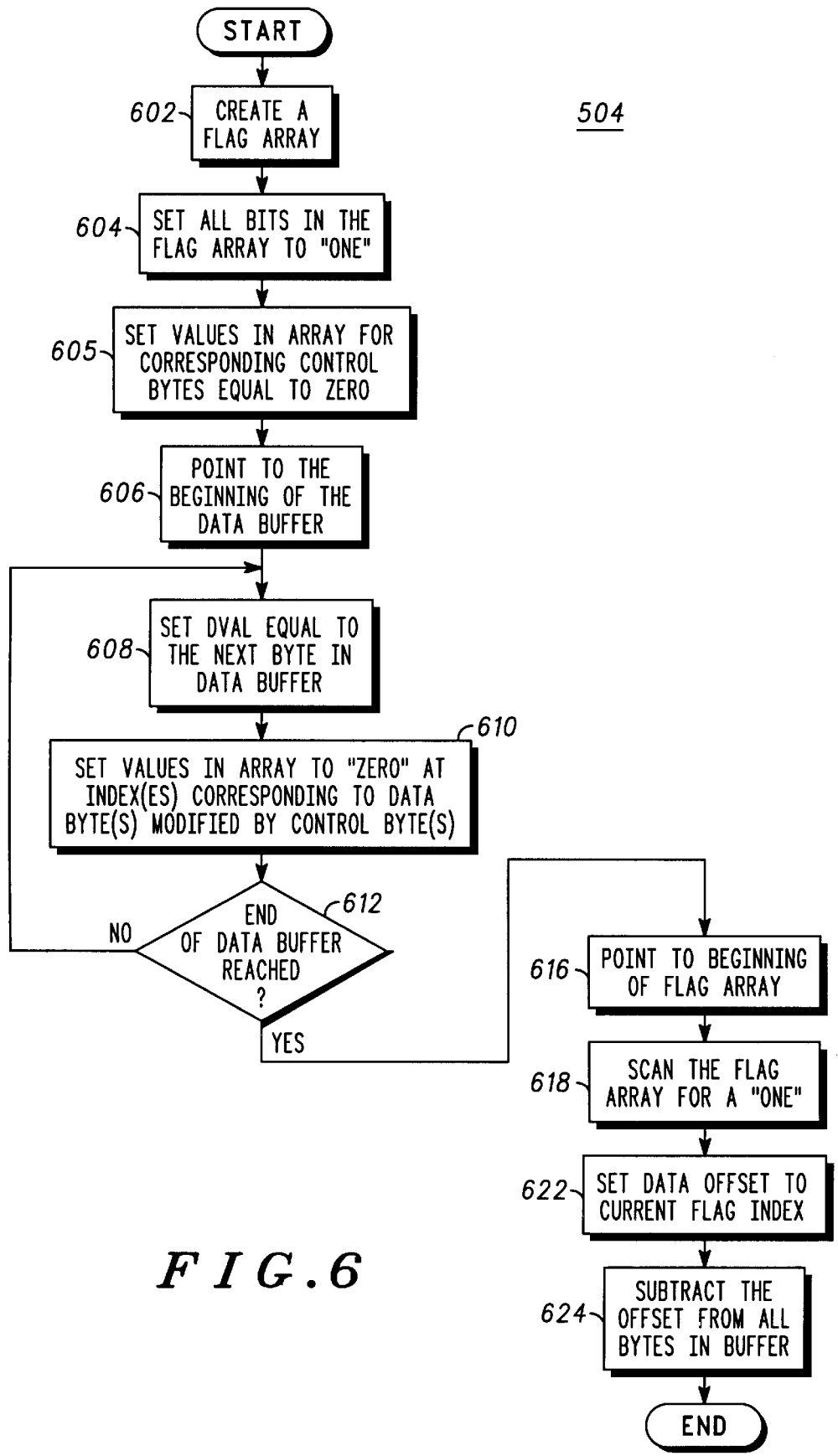
FIG. 6 is a flow chart showing the method for calculating an offset value according to step 504 of the present invention.

Turning now to FIG. 6, the preferred steps for calculating an offset value are shown. In particular, the communication device, preferably in microprocessor 201, creates a 256 bit flag array at a step 602. Each bit in the flag array corresponds to a possible offset value. For an 8 bit offset value, there are initially 256 possible offset values. The bit in the array associated an offset value which will not function properly as an offset value will be charged ("cleared") to zero. The communication device sets all bits in the flag array to a predetermined setting (e.g. "1") at a step 604. The communication device then clears the bits in the array associated with control bits. That is, the offset value should not be the same as a control byte. The communication device sets a pointer to the beginning of a data buffer, for example a voice data buffer, at a step 606. The device then sets the data value (DVAL) equal to next byte in the data buffer at a step 608.

The device then clears the bits in the data field array corresponding to control bytes at a step 610. As has been described, (1) DVAL−OFFSET VALUE≠CONTROL BYTE.

Accordingly, it is also true that (2) DVAL≠CONTROL BYTE+OFFSET VALUE.

Therefore, potential offset values can be eliminated by subtracting the control bytes from each DVAL according to the following equation:

(3) DVAL−CONTROL BYTE≠OFFSET VALUE.

The device then determines whether the end of data buffer is reached at a step 612. If the end of data buffer is not reached, the device will clear the appropriate bits in the data field array at step 610 for each DVAL. However, if the end of data buffer is reached at step 612, the device will point to the beginning of the flag array at step 616. The microprocessor will then scan the array for the next "1" at step 618. The microprocessor will set the data offset to the current flag index at a step 622. The microprocessor will then subtract the offset value from all data bytes in the buffer at a step 624.

Figure 7:
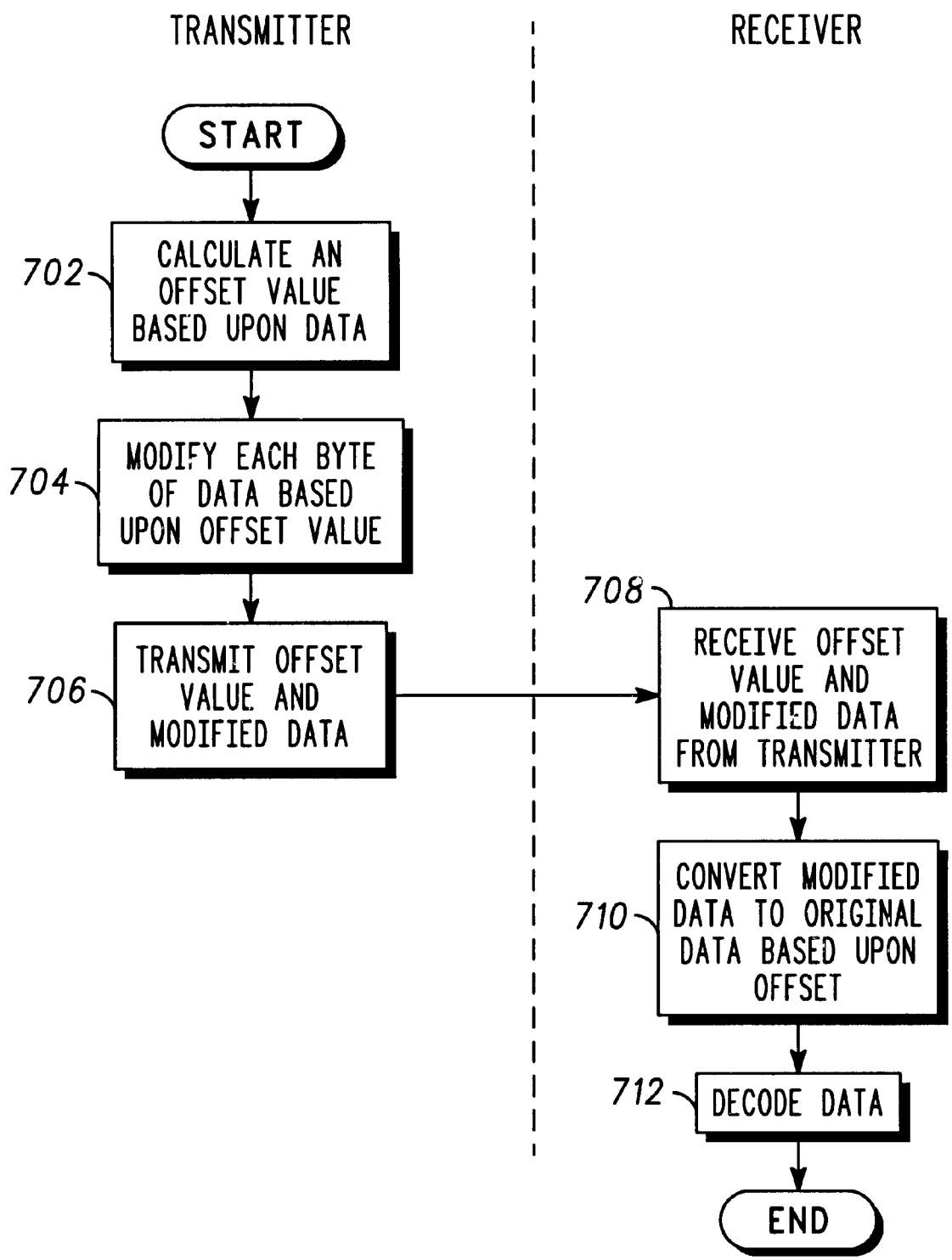
FIG. 7 is a flow chart showing the steps of transmitting and receiving data in a data communication network of FIG. 1 according to the present invention.

Turning now to FIG. 7, the steps for transmitting and receiving data according to the present invention are shown. The transmitter calculates an offset value based upon the data according to the steps of FIG. 6 at a step 702. The transmitter then modifies the data bytes, for example by subtracting the offset value from each byte, at a step 704, and transmits the offset value and the modified data at a step 706. The receiver then receives the offset value and modified data bytes at a step 708, and converts each modified data byte back to its original value (for example, by adding the offset value to the data bytes) at a step 710. The receiver then decodes the data at a step 712. The transmitter and receiver could be communication devices as shown in FIG. 2.

The present invention finds particular application in transmitting voice over and infrared link, such as between a radiotelephone and some accessory. The method and apparatus provides transparency to coded voice data transmitted over an infrared data link, so that bytes reserved for protocol purposes by the infrared data standard are not present in the voice data. The method and apparatus finds particular application in reducing the number of overhead bytes required to transmit full duplex 32 kbps ADPCM coded voice over a 115,200 bps infrared data link. The relaxed timing constraints, resulting from the reduction in added transparency data will facilitate software based implementations of the Infrared Data Association Telecom Voice Specification, and will improve the operation of the infrared data voice link under marginal conditions.

This invention transmits an extra byte of transparency data with each 85 bytes of voice data to insure transparency. This byte is chosen so that when it is subtracted from the 84 voice samples to be transmitted, no reserved bytes for control information will be present in the resulting data. Adding the transparency byte back into all the data bytes in the receiver restores the original data. For example in a protocol having three bytes, such as hex bytes 7D, C0 and C1, it can be shown that there is a unique value which when subtracted from each byte in a packet of up to 84 random bytes, will guarantee that it may be restored in the receiver. This method and apparatus can save as much as 0.851 ms per packet when sending 20 ms packets of speech, and 0.608 ms with the 13.5 msec speech packets.

Although the invention has been described and illustrated in the above description and drawings, it is understood that this description is by way of example only and that numerous changes and modifications can be made by those skilled in the art without departing from the true spirit and scope of the invention. For example, although an apparatus for transmitting asynchronous communication signals is shown, the method and apparatus could be employed to transmit sychronous data. Although the present invention finds particular application in portable cellular radiotelephones, the invention could be applied to any wireless communication device, including pagers, electronic organizers, or computers. Applicant's invention should be limited only by the following claims.

I claim:

1. A method for transmitting data in a frame having data bytes and control information, said method comprising the steps of:

selecting an offset value based upon the value of said data bytes compared to the value of said control information;

modifying said data bytes based upon said offset value, said modified data bytes being different from said control information; and transmitting said modified data bytes.

2. The method for transmitting data according to claim 1 wherein said step of selecting an offset value comprises determining a value which, when used to modify said data bytes, will result in modified data bytes which are different from said control information.

3. The method for transmitting data according to claim 1 wherein said step of modifying said data bytes comprises subtracting said offset value from each said data byte.

4. The method for transmitting data according to claim 1 wherein said step of modifying said data bytes comprises providing an exclusive or operation with said data bytes and a predetermined value.

5. The method for transmitting data according to claim 1 wherein said step of transmitting further includes transmitting said offset value.

6. A method for transmitting data in a frame having at least one control byte, said method comprising the steps of:

partitioning said data into a plurality of data bytes;

analyzing each data byte of said plurality of data bytes to determine if a data byte corresponds to said at least one control byte;

calculating an offset value if a data byte of said plurality of data bytes corresponds to said at least one control byte;

modifying said data byte based upon said offset value such that said data byte as modified is different from said at least one control byte; and transmitting said frame having said modified data byte.

7. The method for transmitting data according to claim 6 wherein said step of calculating an offset value comprises determining a value which, when used to modify said data byte, will result in a modified data byte which is different from said at least one control byte.

8. The method for transmitting data according to claim 7 wherein said step of modifying said data byte comprises subtracting said offset value from said data byte.

9. The method for transmitting data according to claim 7 further comprising a plurality of data bytes which correspond to a plurality of control bytes, wherein said step of calculating an offset value comprises determining a value which, when used to modify said plurality of data bytes, will result in modified data bytes which are different from said plurality of control bytes.

10. A method for transmitting data in a frame having a plurality of control bytes, said method comprising the steps of:
   partitioning said data into a plurality of data bytes;
   selecting an offset value which, when used to modify each data byte of said plurality of data bytes, creates modified data bytes which are different from each control byte of said plurality of controls bytes;
   modifying each said data byte with said offset value for each said data byte respectively; and
   transmitting said offset value and said modified data bytes.

11. A method for transmitting data in a frame and control bytes, said method comprising the steps of:
   partitioning said data into data bytes;
   selecting an offset value based upon the value of said data bytes compared to the value of said control bytes;
   modifying said data bytes based upon said offset value, said modified data bytes being different from said control bytes;
   transmitting said offset value and said modified data bytes from a transmitting station;
   receiving said offset value and said modified data bytes; and
   converting said modified data bytes to said data bytes based upon said offset value.

12. An apparatus for transmitting a data frame having at least one control byte, said apparatus comprising:
   a processing circuit for calculating an offset value based upon the value of data bytes compared to the value of said control byte of a frame of said data bytes to be transmitted;
   a data formatting circuit for generating said data frame having said offset value and modified data bytes; and
   a transmitter for transmitting said data frame.

13. The apparatus for transmitting data according to claim 12 wherein said offset value comprises a value which, when used to modify said data bytes, will result in modified data bytes which are different from said at least one control byte.

14. The apparatus for transmitting data according to claim 12 wherein said modified data bytes comprise data bytes less said offset value.

15. The apparatus for transmitting data according to claim 12 wherein said modified data bytes comprise the result of an exclusive or of the data bytes and a predetermined value.

16. The apparatus for transmitting data according to claim 12 wherein said transmitter comprises an infrared transmitter.

17. The apparatus for transmitting data according to claim 16 further comprising a universal asynchronous receiver transmitter coupled between said processing circuit and said infrared transmitter.

18. An apparatus for transmitting data in a data frame having at least one control byte, said apparatus comprising:
   a processing circuit for calculating an offset value based upon said data frame to be transmitted compared to the value of said control byte and for modifying bytes of data of said data frame;
   a universal asynchronous receiver/transmitter coupled to said processing circuit for generating said data frame; and
   a transmitter coupled to said universal asynchronous receiver/transmitter for transmitting said data frame.

19. An apparatus for transmitting a data frame having at least one control byte, said apparatus comprising:
   a transmitting device having a first processing circuit for calculating an offset value of a frame of data bytes to be transmitted based upon said data frame compared to the value of said control byte, a universal asynchronous receiver/transmitter for generating said data frame having said offset value and modified data bytes, and a transmitter for transmitting said data frame; and
   a receiving device having a receiver for receiving said data frame having said offset value and modified data bytes and a second processing circuit for recovering said data bytes based upon said offset value.

* * * * *